(No Model.)
E. R. DE WOLFE.
BALL BEARING FOR CYLOMETERS.
No. 458,710. Patented Sept. 1, 1891.
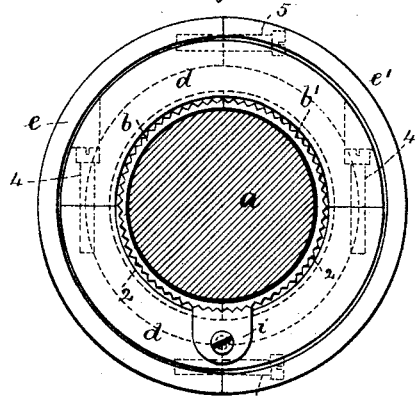
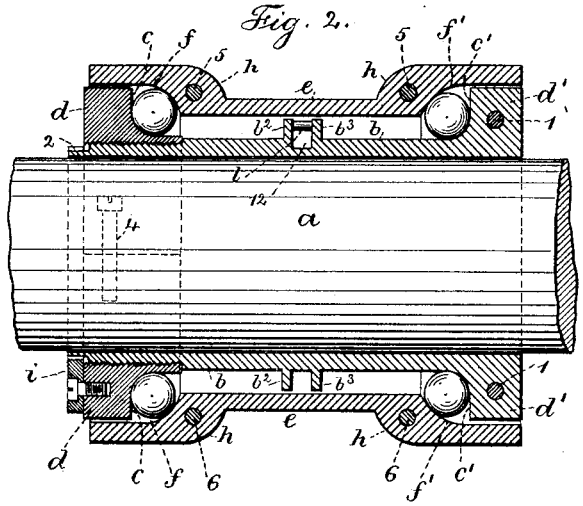
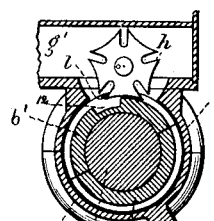
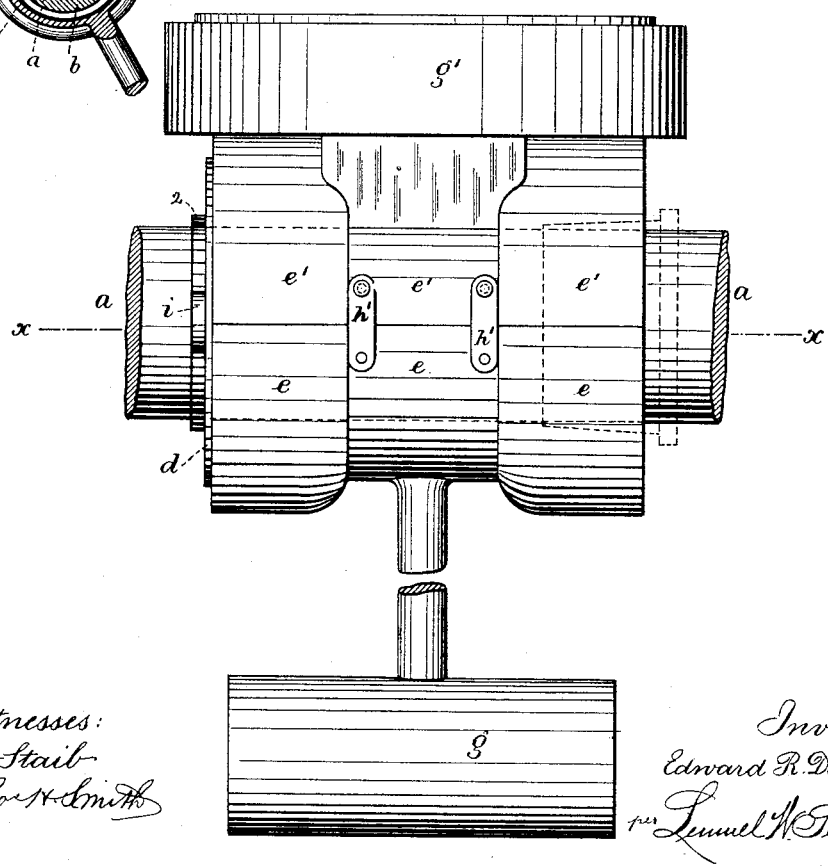
Witnesses:
J. Staib
Chas. H. Smith
Inventor:
Edward R. De Wolfe
per Lemuel W. Serrell atty.
THE NORRIS PETERS CO., PHOTO-LITHO., WASHINGTON, D. C.

UNITED STATES PATENT OFFICE.

EDWARD R. DE WOLFE, OF NEW YORK, N. Y., ASSIGNOR TO HIMSELF AND GEORGE R. BIDWELL, OF SAME PLACE.

BALL-BEARING FOR CYCLOMETERS.

SPECIFICATION forming part of Letters Patent No. 458,710, dated September 1, 1891.

Application filed March 4, 1891. Serial No. 383,703. (No model.)

*To all whom it may concern:*

Be it known that I, EDWARD R. DE WOLFE, a citizen of the United States, residing at the city, county, and State of New York, have invented a new and useful Ball-Bearing for Cyclometers, of which the following is a specification.

My present invention relates to cyclometers or distance-measuring instruments for use upon velocipedes and similar vehicles. Heretofore these instruments have usually been suspended from the axle of one of the wheels, a two-part collar being placed around and secured to said axle, and a two-part sleeve connected, respectively, to the mechanism of the instrument and to its counterbalance-weight, the bearing parts being parallel contact-surfaces. These parallel contact-surfaces require frequent attention and they collect and become clogged with dust and soon cause the instrument to revolve with the wheel and become inoperative, and the object of my invention is to overcome this difficulty.

In carrying out my invention I employ inwardly-curved circumferential bearing-faces at the respective ends of a two-part or divided collar and outwardly-curved circumferential bearing-faces at the respective ends of a two-part or divided sleeve, the bearing-faces of the sleeve coming within those of the collar, and between these curved bearing-faces I employ rows of balls to form a ball-bearing for the cyclometer, and the parts of the sleeve and collar are connected together. The circumferential bearing at one end consists of an adjustable two-part collar or ring, the parts of which are aligned and connected by countersunk screws, and said bearing-ring is connected by a lug or toothed dog with the divided collar, so as to rotate with it. This ring is adjustable to tighten the bearing in taking up slack and wear. This mechanism is not affected by dust to any appreciable extent.

The operative mechanism of the cyclometer whereby the rotation of the axle is communicated to the train of wheels of the recording mechanism is preferably to be the same as that shown and described in my Letters Patent for improvement in cyclometers, dated March 3, 1891, and numbered 447,540.

In the drawings, Figure 1 is an elevation. Fig. 2 is a longitudinal section at *xx* of Fig. 1. Fig. 3 is an end view of the parts as shown in Fig. 2, and Fig. 4 is a view illustrative of the operative mechanism.

*a* represents the axle of a velocipede-wheel. *b b'* represent the parts of the two-part collar, upon the respective ends of which are the inwardly-curved circumferential bearing-faces *c c'* and rings *d d'*. One ring *d'* is formed as part of the divided collar, and countersunk screws 1 pass through the same to hold the collar together at one end. The other end of the divided collar *b b'* is externally threaded and the extreme end is made slightly smaller and with serrations at 2. The other ring *d* is independent of the collar, but is internally threaded and adapted to screw upon said collar. This ring *d* is in two parts and is held together by countersunk screws at 4, and one circumferential bearing is on this ring *d*. A wrapping of paper, sheet rubber, or other similar material is to be placed around the axle and within the said divided collar, so as to bind the same to the axle and compel it to turn with said axle. Tapering wedge-shaped collars of soft metal or hard rubber, as shown in Fig. 1 by dotted lines, may surround the axle *a* and be movable thereon and within the collar to clamp to place the aforesaid collar. This device is more quickly applied than the wrapping.

*e e'* represent the parts of the divided sleeve or housing adapted to surround the collar. The part *e* has connected to or formed with it the counterbalance-weight *g*, and the part *e'* has connected to or formed with it the case *g'*, containing the dial and mechanism of the cyclometer. The parts of the sleeve or housing have projections or lugs *h*, through which pass countersunk screws 5 6 to hold the same together. Small straps *h'*, (shown in Fig. 1,) having attaching screws or pins, may connect the parts of the sleeve. The respective ends of the divided sleeve are made with curved circumferential bearing-faces *f f'*. Rows of small anti-friction balls are inserted between the circumferential bearing-faces *c f* and *c' f'*, and the ring *d* is to be rotated around the collar to bring up the parts snugly together after the balls are inserted.

A dog $i$, having a serrated edge, is adapted to fit the serrations at 2, and this dog is held by a screw to the ring $d$, so as to maintain the position and adjustment of the parts and compel the collar $b\ b'$ and ring $d$ to turn together with the axle $a$.

My improved anti-friction ball-bearing cyclometer is easily placed upon a wheel-axle, runs smoothly, and is not affected or impaired by dust, and as the movement at the axle is comparatively slow it is not necessary to employ any oil in the ball-bearing. Consequently dust will not collect or settle to impair the operation, as is the case where oil is used.

The operative parts shown in Fig. 4 consist, essentially, of the circumferential flanges $b^2\ b^3$, between which a groove is formed, with a depressed portion at 12 and a pin $l$, and the radially-slotted disk or "Geneva" wheel at $h$, mounted in the case of the cyclometer and operated by the pin $l$ to in turn act upon the train of gears of the cyclometer mechanism to effect the speed-recording, as set forth in my application herein referred to.

I claim as my invention—

1. The combination, in a cyclometer, with the divided collar and divided sleeve or housing, of circumferential bearing-faces at the respective ends of the collar and sleeve and rows of balls between said bearing-faces, substantially as set forth.

2. The combination, in a cyclometer, with the divided collar and divided sleeve or housing, of inwardly-circumferential bearing-faces at the respective ends of the divided collar, outwardly-circumferential bearing-faces at the respective ends of the sleeve, one of which bearing-faces is adjustable, and rows of balls between said bearing-faces, substantially as set forth.

3. The combination, in a cyclometer, with the divided collar and divided sleeve or housing, of circumferential bearing-faces at the respective ends of the divided sleeve, and a circumferential bearing-face at one end of the divided collar and external threads at the other end, a divided ring internally threaded to screw onto the collar and having a circumferential bearing-face, means for holding said ring in place, and balls in rows between the bearing-faces, substantially as set forth.

Signed by me this 13th day of February, 1891.

E. R. DE WOLFE.

Witnesses:
GEO. T. PINCKNEY,
WILLIAM G. MOTT.